United States Patent

Tambo et al.

[11] Patent Number: 5,407,566
[45] Date of Patent: Apr. 18, 1995

[54] APPARATUS FOR DISPOSING OF WASTE WATER

[75] Inventors: Norihito Tambo, 10-33, Tonden 2jo 4-chome, Kita-ku, Sapporo-shi Hokkaido 060; Tatsuo Shimizu, 6-7-33, Hachiken 3jo Nishi 3-chome, Nishi-ku, Sapporo-shi, Hokkaido 063, both of Japan

[73] Assignees: Norihito Tambo; Tatsuo Shimizu; Tsukishima Kikai Co., Ltd., all of Hokkaido, Japan

[21] Appl. No.: 912,519

[22] Filed: Jul. 13, 1992

[30] Foreign Application Priority Data

Jul. 12, 1991 [JP] Japan .................. 3-197265

[51] Int. Cl.⁶ .............................. C02F 3/30
[52] U.S. Cl. ...................... 210/195.1; 210/202; 210/219; 210/259
[58] Field of Search ............ 210/603, 605, 620–622, 210/630, 631, 195.1, 201, 202, 208, 219, 220, 252, 257.1, 259

[56] References Cited

U.S. PATENT DOCUMENTS 3,764,523 10/1973 Stankewich, Jr. .................. 210/631
4,460,470 7/1984 Reimann ........................... 210/605
4,894,162 1/1990 Cournoyer et al. ................ 210/631

Primary Examiner—Thomas Wyse
Attorney, Agent, or Firm—Antonelli, Terry, Stout & Kraus

[57] ABSTRACT

Waste water is disposed in a flocculation mixing tank 1, an anaerobic tank 2 and an aerobic tank 3 connected in series. First, a dephosphorization flocculating agent and, if necessary, a polymeric flocculating agent are added to waste water in order to produce and grow phosphorus-containing flocs therein. Then, to the water is added a recycling solution from an aerobic tank 3, said solution containing nitrates and nitrites. The mixture water is charged in an anaerobic tank 2 until microbially decomposable components (herein referred to BOD components), nitrates and nitrites are anaerobically and microbially decomposed and gas is produced. In the aerobic tank 3 is charged a supernatant solution from the anaerobic tank 2, said solution containing ammonium compound and BOD components, to nitrates, nitrites and $CO_2$. At least a part of supernatant solution containing the nitrates and nitrites is recycled to the anaerobic tank 2. Solids discharged from the anaerobic tank 2 and the aerobic tank 3 are wasted. Nitrogen compounds and phosphorus compounds as well as BOD components are removed from waste water.

11 Claims, 1 Drawing Sheet

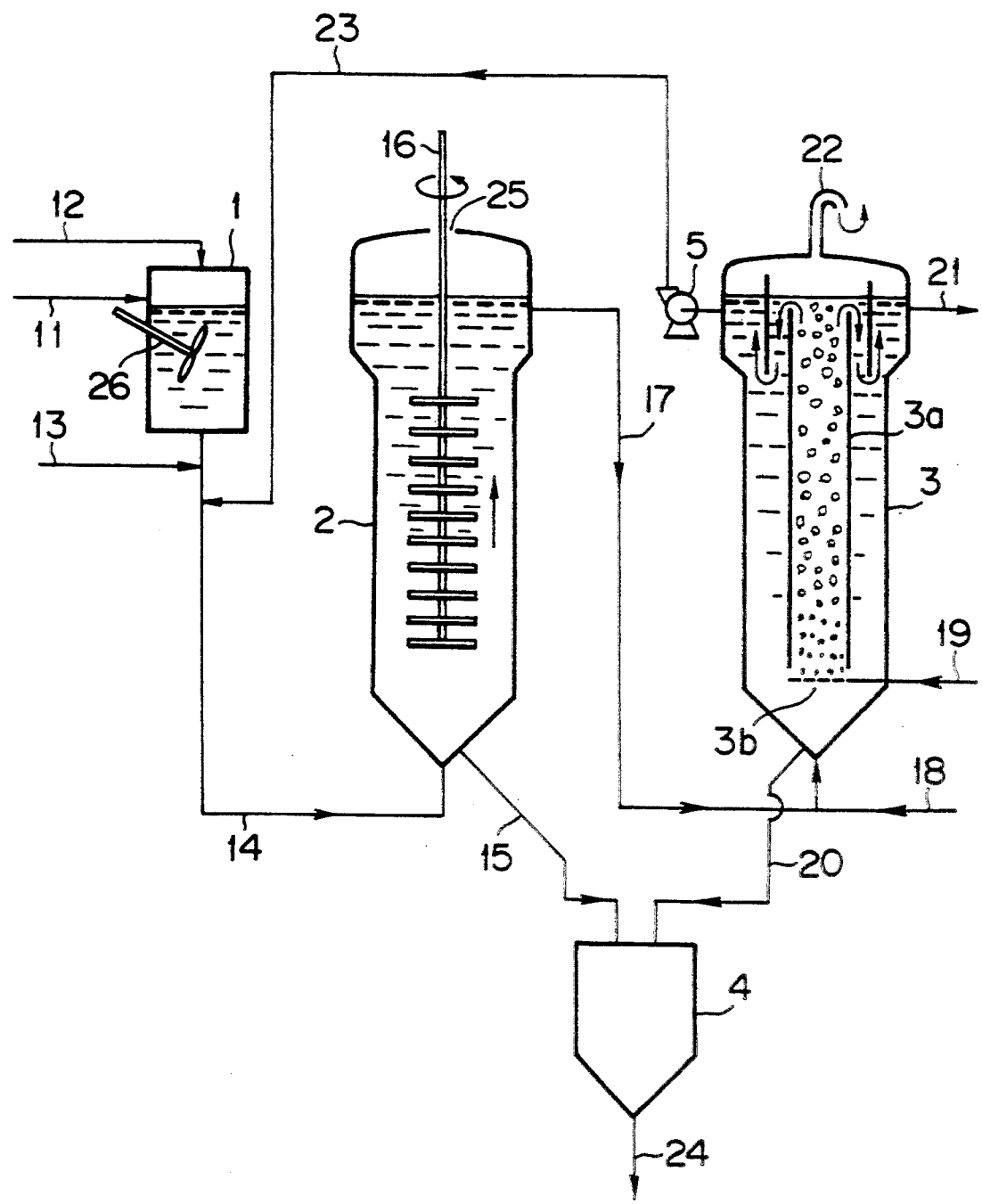

APPARATUS FOR DISPOSING OF WASTE WATER

The present invention relates to a process for disposing waste water and a plant therefor. More particularly, the present invention relates to a process for disposing waste water and a waste water-disposal plant in which not only organic materials but also nitrogen compounds and phosphorus compounds in waste water are removed efficiently.

One of conventional methods for disposing drainage and industrial waste water (both being generally referred to hereinafter as waste water) is an activated sludge method. According to this method, microbially decomposable organic substances (referred to hereafter as BOD component) contained in waste water are removed with a percentage as high as of 80–90%, but nitrogen compounds and phosphorus compounds are removed in a quite low percentage (percentages of removing nitrogen compounds and phosphorus compounds referred to hereinafter as denitrification rate and dephosphorization rate, respectively). Moreover, the disposal of these compounds requires a long time of ten and several hours and a large installation cost and also requires a large area and space for the installation.

In addition, there are two methods, e.g., a recycling method and a modified recycling method for biologically removing nitrogen compounds from waste water. In the recycling method, waste water from which deposits have been removed in an initial settling pond is supplied to a denitrification tank for anaerobical disposal, then the treated waste water is introduced into a nitrification tank where a treatment is effected in an aerobic atmosphere, and further introduced into a final settling pond while a part of nitrified solution is recycled into the aforementioned denitrification tank. Furthermore, sludge in the final settling pond is recycled to the denitrification tank after being mixed with the waste water from the initial settling pond. This method requires a residence time in a biological reactor as long as of 13–16 hours. Although, since denitrification capacity according to this method reaches a level as high as 70–80%, denitrification is conducted effectively, dephosphorization is not satisfactory for practical use. Although phosphorus compounds are once fixed to excess sludge, they are released again under an anaerobic state. Furthermore, a sludge concentration is kept at so low level that a reactor having a large capacity is required in the recycling method.

In the modified recycling method, an anaerobic tank is further provided in front of the denitrification tank provided in the aforementioned recycling method. A mixture of the recycling sludge from the final settling pond and the waste water from the initial deposition is subjected to a reaction with a BOD component under an anaerobic condition in the anaerobic tank in order to release the phosphorus from microorganisms in sludge and to promote the taking in of phosphorus under an aerobic condition. Then denitrification and aerobic nitrification are effected so that denitrification and dephosphorization are simultaneously conducted. According to this method, time required for the disposal is extensively decreased but denitrification rate and dephosphorization rate is not satisfactory for practical use and the problem of re-release of phosphorus compounds still remains unsolved.

As regards the dephosphorization, the following methods have been hitherto believed to be useful. That is, there are a method for removing phosphorus compounds as precipitates by directly pouring chemical solutions of aluminium, calcium and the like into an aeration tank and reacting the chemicals with the phosphorus compounds, a method for removing the phosphorus compounds by passing through a tower or a tank in which adsorbing agents such as activated alumina and the like are packed and adsorbing the phosphorous compounds on the adsorbing agents, and a crystallizing-dephosphorization method by controlling the pH of a phosphorus-containing solution to lead the phosphorus compounds to a metastable super-saturated state and crystallizing the phosphorus on a variety of particles. These methods, however, are able to remove only the phosphorus compounds, but hardly remove the other pollutants such as the BOD component and the nitrogen compounds.

The present inventors have succeeded in a process for removing pollutants such as suspended solid components (referred to hereafter as SS components), BOD components, nitrogen compounds, phosphorus compounds and the like from waste water in a short period and at a high removing efficiency without causing bulking, and miniatuarizing the apparatus.

According to the present invention, a process for disposing of waste water is conducted by providing the first anaerobic disposal process and the second aerobic disposal process in series and continuously removing at least SS components, BOD components, nitrogen compounds and phosphorus compounds in waste water, comprising a) adding a flocculating agent to waste water feed to produce phosphorus-containing flocs, if desired, further adding a polymeric is flocculating agent thereto in order to grow further said phosphorus-containing flocs, and mixing the water with a recycling solution from the second aerobic disposal process, said solution containing at least nitrates and nitrites to obtain a mixed waste water containing the phosphorus-containing flocs, b) introducing the mixed waste water containing the phosphorus-containing flocs into the first anaerobic disposal process containing at least denitrification bacteria, anaerobically decomposing therein soluble organic substances and the BOD components derived from the SS components and converting nitrates and nitrites to nitrogen gas, c) removing solids from the water which have been treated in said anaerobic disposal process to obtain a supernatant solution, d) introducing said supernatant solution resulting from the anaerobic disposal process into the second aerobic disposal process containing at least nitrification bacteria, converting therein ammonium compounds present in said supernatant solution to nitrates and nitrites and decomposing aerobically residual microbially decomposable organic substances in order to exhaust gases from said process, and e) recycling at least a part of the solution aerobically treated above (hereinafter referred to "soluton aerobically treated") or a solution obtained after the SS components have been removed from the solution aerobically treated into an inlet of said anaerobic disposal process.

FIG. 1 shows a flow-sheet of one of examples of a waste water disposal apparatus of the present invention.

The kind and the composition of waste water treated in the present invention is not specifically limited so long as the waste water contains at least the SS components, the BOD components, the nitrogen compounds and the phosphorus compounds. The typical examples are stockbreeding wastes, waste waters discharged from pulp manufacturing factories, waste waters in various food industries such as production of bread yeast, processing of fluits, production of sugar and starch, production of alcohols such as wine, beer and the like, waste waters in fermentation industries such as bean paste, soy and the like as well as general drainage and domestic waste waters such as drawn human waste and waste water of cooking. The present invention can also be applied to the waste water which has been subjected to preliminary treatments such as filtration and treatment with active carbon.

As an example of waste water, 1 liter of waste water practically comprises

| | |
|---|---|
| BOD: | 1,000 mg or less, |
| total nitrogen (T-N): | 100 mg or less, |
| total phosphoric acid (T-P): | 40 mg or less, |
| suspended solid component (SS): | 1,000 mg or less, |
| organic suspended substance (VSS): | 1,000 mg or less. |
| (in accordance with JIS or authorized method) | |

According to the present invention, waste water having a high content of organic suspended substances is treated, and such waste water having a high content of organic suspended substances is more preferably treated.

A flocculating agent for dephosphorization is added to and mixed with waste water to be treated to form phosphorus-containing flocs. The flocculating agent for dephosphorization is not specifically limited so long as it reacts with phosphorus compounds to form water-insoluble flocs. As the typical examples of the flocculating agent, there are mentioned:

(1) aluminium flocculating agent: polyaluminium chloride, aluminium sulfate and the like,
(2) iron flocculating agent: polyiron, ferric chloride, ferrous sulfate,
(3) Ca compounds: $CaCO_3$, $Ca(OH)_2$, $CaO$ and the like,
(4) the other metal salts: salts of Mg, Zn, Ba and the like,
(5) blast furnace slag, coal ash and the like.

An amount of the flocculating agent for dephosphorization is enough to be the stoichiometric amount to the amount of the phosphorus compounds present in waste water. Practical amount is preferably in a proportion of about 2 moles, particularly about 3-5 moles to 1 mole of the phosphorous compounds. In this connection, it is preferred to bring the flocculating agent for dephosphorization in contact with waste water and to stir vigorously the mixture to form phosphorus-containing flocs smoothly.

In order to further grow the phosphorus-containing flocs, the other flocculating agent such as polymeric flocculating agents is preferably added. The polymeric flocculating agents are, for example, anionic polymeric flocculating agents such as an anionic polyacrylamide and anionic polysodium acrylate. The polymeric flocculating agents are usually used in a concentration within the range of about 0.1-20 ppm. Formation of flocculated flocs greatly decreases an amount of phosphorus compounds remaining in the waste water. When both dephosphorization agents and polymeric flocculating agents are used, any of them are firstly added, but preferably first dephosphorization agents.

A recycling solution resulting from the second aerobic disposal process and containing nitrates and nitrites (referred to hereinafter as a recycling solution) is mixed with the phosphorus-containing flocculated waste water to give a mixed waste water having the phosphorus-containing flocs (referred to as mixed waste water). The ratio of the recycling solution added to the phosphorus-containing flocculated waste water (referred to hereinafter as recycling ratio) should be determined so that the ratio of the BOD component to the total nitrogen dissolved in the solution to be treated in the next anaerobic disposal process (mixed waste water) be in the range of 2.86 or more which is the theoretical value in the anaerobic disposal of waste water. In this connection, the recycling ratio (volume ratio) varies depending on the compositions of waste water and the recycling solution, but usually in the range of about 0.5-5.

The flocculation process is applied to a waste water having a pH in the range of about 5-9 at a temperature of about 8°-40° C. However, waste water has usually pH and temperature of the above-described ranges, and thus no further artificial control is usually required.

The mixed waste water which contain the phosphorus-containing flocs thus obtained is delivered to the next anaerobic disposal process.

In the anaerobic disposal process of the first stage, the BOD components, nitrates and nitrites are anaerobically reduced and decomposed by microorganisms in the same manner as in the conventional anaerobic waste water-disposal process, and finally gas such as nitrogen gas or the like is produced. In other words, the SS components are hydrolyzed and solubilized by microorganisms. The BOD components dissolved in the mixed waste water and the solubilized BOD components are converted to gases such as carbon dioxide gas or the like via organic acids. Also, the nitrates and the nitrites are finally converted to nitrogen gas by the nitrate respiration and the nitrite respiration of facultative anaerobes. In this connection, the aforementioned BOD component works as a hydrogen donor in this case. The ammonium compounds in the mixed waste water is consumed only as a nutrient of various microorganisms in the anaerobic disposal process and receives substantially no chemical changes. Phosphorus compounds eluted from the phosphorus-containing flocs, a small amount of phosphorus compounds dissolved in the mixed waste water and a part of the nitrates and the nitrites are also comsumed as the nutrient of various microorganisms. Thus, when substances are decomposed in the anaerobic disposal process, microorganisms are also proliferated. No artificial procedures such as pH adjustment and temperature control are usually required specifically in this process.

Thus, solids are separated and removed from water treated in the first anaerobic disposal process (referred to hereinafter as anaerobic disposal solution ) by the conventional solid-liquid separating means such as sedimentation, centrifugation, filtration or the like, and a supernatant solution (referred to hereinafter as anaerobically treated-supernatant solution) is obtained. The solids removed herein include mainly phosphorus-containing flocs and microorganisms. The supernatant solution contains the BOD component, the ammonium compounds and a small amount of phosphorus compounds.

The anaerobically treated-supernatant solution is delivered to the next aerobic disposal process. In the aerobic disposal process of the second stage, the BOD components and the ammonium compounds are aerobically oxidized by microorganisms in the presence of a molecular oxygen-containing gas such as air, and finally carbon dioxide gas, nitrates and nitrites are produced in the same way as in the conventional aerobic waste water disposal process. That is, the BOD components are oxidized by microorganisms and finally changed into carbon dioxide gas. The carbon dioxide gas is exhausted together with a molecular oxygen-containing gas from the aerobic disposal process. The ammonium compounds are changed into nitrates and nitrites by nitrate bacteria and nitrite bacteria. The BOD components, the ammonium compounds, a part of the nitrates and the nitrites, and a small amount of residual phosphorus compounds are comsumed as nutrients of various microorganisms in the aerobic disposal process.

In the aerobic disposal process, a moleculer oxygen-containing gas such as air, an oxygen-mixed gas or oxygen is aerated through the water in order to supply molecular oxygen and to avoid the insufficiency of dissolved molecular oxygen in the water.

When the suspended activated sludge process is applied as the aerobic disposal process, it is preferred to add a small amount of 0.01–0.05 ppm of cationic polymeric flocculating agents in order to prevent bulking. In the aerobic disposal process, no other artificial operations than aeration, such as the adjustment of pH and control of temperature, are required specifically.

Solids are usually removed from the water treated in the second aerobic disposal process by the conventional solid-liquid separation means such as sedimentation, centrifugation, filtration and the like to give a supernatant solution. At least a part of the water aerobically treated or a part of the supernatant solution obtained after any suspended solids are removed from the aerobically treated solution is recycled to the inlet of the anaerobic disposal process. The remainder is discharged or subjected to reuse directly or after various treatments are applied to, depending on necessities.

A waste water-disposal apparatus suitable for the disposal process of the present invention is further described.

The waste water-disposal apparatus comprises at least three tanks, i.e. (1) a flocculation-mixing tank provided with a waste water-supply pipe, a supply pipe of flocculating agents for dephosphorization and a stirrer, (2) an anaerobic tank for anaerobically and microbially decomposing pollutants in waste water, said tank being provided with a gas exhaust outlet at the upper part, and (3) an aerobic tank provided with a gas-exhaust outlet and an overflow pipe at the upper part and a means for feeding a molecular oxygen-containing gas at the lower part and for microbially oxidizing pollutants in a supernatant solution delivered from the anaerobic tank (2). The flocculation mixing tank and the anaerobic tank are connected by a mixed waste water pipe. The anaerobic tank and the aerobic tank are connected by a pipe for delivering the supernatant solution in the anaerobic tank. The aerobic tank and the inlet of the anaerobic tank are connected by a recycling solution-supply pipe. The anaerobic tank and the aerobic tank are provided with a solid-separating means, respectively. In this connection, in order to add polymeric flocculating agents to the mixed waste water containing the phosphorus-containing flocs, a polymeric flocculating agent-supply pipe is preferably connected to the mixed waste water pipe.

In the apparatus of the present invention, a flocculation-mixing tank and an anaerobic tank may be integrated. Furthermore, a solid-separating means may be built in the anaerobic tank. Furthermore, the flocculation-mixing tank, the anaerobic tank and the solid-separating means may be integrated.

Any type of an anaerobic tank is used. A vertical tank in which the lower layer is a floc layer and solution is flowed ascendingly within the tank through the floc layer is preferred. It is also preferred to provide a stirrer such as a rotary stirrer or the like within the tank. As the anaerobic tank, a complete-mixing type reactor may also be used.

Any aerobic tank is used. A reactor in which a solid-separating means is built may be used. A fixed bed reactor or a fluidized bed reactor wherein immobilized products obtained by immobilizing microorganisms, enzymes or activated sludges containing them by the conventional method are provided may be used. In this connection, an aerobic self-granulation reactor wherein granulation ability of the microorganisms is utilized may also be used. Solutions aerobically treated, e.g. those obtained from the fixed bed reactor or the fluidized bed reactor wherein the immobilized products are provided or the aerobic self-granulation reactor, do not contain so much SS components that they are able to recycle as they are without any separation of solids from the solution.

The solid-separating means include the conventional solid-liquid separating means such as a sedimentation tank, a centrifuge and a filter and the means for discharging the solid separated by the solid-liquid separating means from the process, e.g. solid-discharging pipe.

EXAMPLES

The present invention is further explained with reference to Examples, but the present invention is not limited to these Examples.

Example 1

One of examples of the waste water disposal apparatus of the present invention is explained referring to the flow-sheet illustrated in FIG. 1.

The waste water disposal apparatus comprises a flocculation mixing tank 1, an anaerobic tank 2 and aerobic tank 3.

The flocculation mixing tank 1 have a built-in rotary stirrer 26, and a waste water-supply pipe 11 and a supply pipe of a flocculating agent for dephosphorization 12.

The anaerobic tank 2 is a vertical tank in which a stirrer 16 is provided and a gas exhaust pipe 25 is further provided at the upper part. The inside of the tank works as a sedimentation tank.

The aerobic tank 3 is a vertical tank in which an aeration cylinder 3a is provided at the center and a sparger 3b communicated with an air-feeding pipe 19 is also provided under the aeration cylinder 3a. A hollow cylinder part formed by the outer circumference of the aeration cylinder 3a and the inner circumference of the aerobic tank 3 works as a sedimentation tank. The bottom of the flocculation mixing tank 1 and the bottom of the anaerobic tank 2 are connected by a mixed waste water pipe 14. To the mixed waste water pipe 14 is connected a polymeric flocculating agent supply pipe 13. The upper part of the anaerobic tank 2 and the bottom part of the aerobic tank 3 are connected by an overflow pipe 17. The overflow pipe 17 is communicated with a polymeric flocculating agent-supply pipe 18 at the bottom part of the aerobic tank 3.

The upper part of the aerobic tank 3 and the mixed waste water pipe 14 are connected via a pump 5 by a recycling solution-supply pipe 23.

Solid-discharging pipes 15 and 20 are provided at the bottom parts of the anaerobic tank 2 and the aerobic tank 3, respectively. These pipes 15 and 20 are respectively connected to a solid reservoir 4. A solid-drawing pipe 24 is provided at the bottom part of the solid reservoir 4.

Waste water containing at least the SS components, the BOD components, the nitrogen compounds and the phosphorus compounds is supplied from the waste water-supply pipe 11 to the flocculation mixing tank 1. A flocculating agent for dephosphorization is added to the waste water through a supply pipe of flocculating agents for dephosphorization 12. The waste water is vigorously stirred until phosphorus-containing flocs are formed. Phosphorus-containing flocculated waste water is discharged from the flocculation mixing tank 1 and to the water is added a polymeric flocculating agent through a polymeric flocculating agent-supply pipe 13. Then, the mixture was mixed with a recycling solution led by a recycling solution-supply pipe 23. The mixed waste water having the phosphorus-containing flocs is delivered through a mixed waste water-supply pipe 14 to the bottom part of the anaerobic tank 2. The mixed waste water was brought in contact with a variety of microorganisms while being ascended in the anaerobic tank 2 until the BOD components, the nitrates and the nitrites contained in the mixed waste water are anaerobically decomposed to produce gas such as the nitrogen gas and the carbon dioxide gas. These gases form bubbles, ascend through the tank 2 together with the mixed waste water and are finally released from a gas exhaust 25. On the other hand, solids such as phosphorus-containing flocs and microbial cells descend through the anaerobic tank 2, deposit on the bottom of the tank and form a layer of the solids. Excess solids are discharged from the bottom part of the layer of the solids through the solid-discharge pipe 15 to the outside of the tank. The mixed waste water ascends through the layer of the solids.

Anaerobically treated transparent solution in which the solids have been sedimented while the waste water acends in the tank is fed from the upper part of the anaerobic tank 2 to the bottom part of the next aerobic tank 3 via an overflow pipe 17. In the anaerobically treated solution, the HOD components, the ammonium compounds and the like are contained. The anaerobically treated transparent solution is mixed with a polymeric flocculating agent supplied through a polymeric flocculating agent-supply pipe 18 which is connected with the overflow pipe 17 below the aerobic tank 3.

The anaerobically treated transparent solution supplied from the bottom part of the aerobic tank 3 is brought in contact with air which is supplied by an air-feeding pipe 19 and released from pores at the sparget 3b in the aeration cylinder 3a. The BOD components and the ammonium compounds contained in the transparent solution is oxidized by microorganisms, and finally carbon dioxide gas, nitrates and nitrites are produced. The carbon dioxide gas and the supplied air ascend through the aeration cylinder 3a together with the solution and released from the aerobic tank 3 via the opening at the top of the tank and a gas exhaust pipe 22.

Solids containing the microbial cells or the like are sedimented in the hollow cylinder which is defined by the exterior side of the aeration cylinder 3a and the interior side of the aerobic tank 3. The sedimented solids deposit on the bottom of the aerobic tank 3 until the layer of the solids is formed. Excess solids at the bottom of the layer of the solids are gradually discharged from the tank via the solid-discharging pipe 20. The transparent solution stay at the upper part of the hollow cylinder of the aerobic tank 3. The transparent solution contains nitrates, nitrites and the like.

At least a part of the transparent solution is recycled to the anaerobic tank 2 from the inlet of the tank 2 in the form of mixed waste water via a pump 5, the recycling solution-supply pipe 23 and the mixed waste water pipe 14. The remainder of the transparent solution is discharged from an overflow pipe 21 to the outside of the tank.

The solids discharged from the bottoms of the anaerobic tank 2 and the aerobic tank 3 via the solid-discharging pipes 15 and 20, respectively, are stored in a solid reservoir tank 4 and appropriately discharged via a solid-drawing pipe 24.

Example 2

City drainage was treated with the waste water disposal apparatus described in Example 1 during the period from Nov. 1, 1990 to May 15, 1991.
(1) Elements of the apparatus
  (i) Flocculation mixing tank
      Length: 100 mm, width: 100 mm and depth: 150 mm;
      Internal volume: 1.43 liter;
      A paddle having a paddle part of 80 mm long is provided.
  (ii) Anaerobic tank
      100 mm$\phi \times$2 m high; a separating part of 150 mm$\phi \times$200 mm high is provided at the top. Paddles having the wing of 90 mm long and 20 mm wide are provided at an interval of 80 mm.
  (iii) Aerobic tank
      200 mm$\phi \times$2 m high; an aeration cylinder of 100 mm$\phi \times$1.8 m high is built in the center.
(2) Elements of the operation
  (i) Flocculation mixing tank
      Waste water feed: Drainage in which untreated city drainage obtained after merge drainage had been passed through a rough meshed screen and a sand settling pond was further passed through a screen (2.5 mm mesh). The composition of the drainage is shown in Table 1.
      Supply rate: 7.8 l/hr.
      Recycling solution: Supply rate, 7.8–39.1 l/hr. The composition of the solution is shown in Table 1.
      Flocculating agent for dephosphorization: polyaluminium chloride,
      amount: 8–11 ppm
      pH: 7.0.
      Temperature: 8°–18° C.
      Stirring: Rotation rate of paddle, 200 rpm.
      Residence period: 5 minutes.
  (ii) Anaerobic tank
      Volume of the solid layer: 11 liter.
      Stirring: Rotation rate of paddle, 1–5 rpm.
      Residence time: 2 hours.

Polymeric flocculating agent: Weak anionic polymer (Himolock SS-220, trade name Kyoritsu Yuki Kogyo Kenkyusho, K.K.), concentration, 1–2 mg/l.

Exhausted gas: 14 l/day.

Discharged anaerobically treated transparent solution: 15.6–46.8 l/hr. The composition is shown in Table 1.

Discharged solid: 50 g/day in terms of dry amount.

(iii) Aerobic tank

Volume of aeration cylinder; 13 liter.

Aeration rate: 2.6 l/min.

Residence period: 2 hours.

Polymeric flocculating agent: Strong cationic polymer (Polymethacrylate ester "C-480H", trade name, Mitsui Cyanamide K.K.), concentration, 0.1 mg/l.

Discharged aerobically treated transparent solution: 15.6–46.8 l/hr.

Discharged solid: ca. 1–2 g/day in terms of dry amount.

TABLE 1*

| Item | Waste water feed | Anaerobically treated transparent solution | Aerobically treated transparent solution | Final removal ratio (%) |
|---|---|---|---|---|
| Suspended substance (mg/l) | 261.3 | 10.5 | 4.1 | 99 |
| Total BOD component (mg/l) | 124.9 | 14.5 | 7.1 | 94 |
| Suspended BOD component (mg/l) | 16.6 | 12.5 | 6.3 | |
| Total COD component (mg/l) | 287 | 25 | 11.9 | 95 |
| Suspended COD component (mg/l) | 39.1 | 22 | 9.1 | |
| Ammonia nitrogen (mg/l) | 20.8 | 5.2 | 0.1 | 75*** |
| Nitrate nitrogen** (mg/l) | 0.1 | 0.1 | 5.1 | |
| Total phosphoric acid (mg/l) | 2.8 | 0.0 | 0.0 | 100 |
| Ortho phosphoric acid (mg/l) | 1.6 | 0.0 | 0.0 | 100 |
| SS component of activated sludge (mg/l) | — | 3,800 to 8,000 | 1,400 to 2,700 | — |
| VSS component of activated sludge (mg/l) | | 1,300 to 6,500 | 800 to 1,800 | — |

*Values in the table show the average values during the working period (continuous working data for 180 days).
**Containing the nitrite nitrogen.
***Removal ratio of whole NO$_3$ and NH$_3$.

In this Example, sludge residence time (SRT) reached 48 hours, and the specific proliferation rate $\mu$ of dinitrification bacteria in the anaerobic tank was in the range of 0.2–0.4/hr, so that it was possible to maintain the concentration of the denitrification bacteria at a high level. In addition, no problems such as bulking or the like happened during this period.

According to the present invention, pollutants such as the BOD components, the nitrogen compounds and the phosphorus compounds are removed from various waste waters in a short time and at a high removal ratio without bulking, and the solid precipitates are easily dehydrated. Moreover, the present invention allows to miniatuarize the apparatus.

What is claimed is:

1. A waste water disposal apparatus comprising, an flocculation mixing tank having a waste water supply pipe for supplying microbiologically oxidizable wastes in water to the tank, a stirrer for stirring the waste water in the tank and a dephosphorizating flocculent agent supply pipe for supplying the agent to the tank, an anaerobic microbial decomposition tank downstream from said flocculation mixing tank containing anaerobic microorganisms capable of decomposing said wastes in water, containing a solid separating means, for removing accumulated flocculated phosphorus-containing solids from the bottom of said anaerobic microbial decomposition tank through a pipe, and with a pipe means for delivering waste water from said flocculation mixing tank to a bottom of the anaerobic microbial decomposition tank, an aerobic microbial oxidizing tank downstream from said anaerobic microbial decomposition tank containing aerobic microorganisms capable of decomposing said Wastes in water, means for feeding oxygen-containing gas at a lower part of the aerobic microbial oxidizing tank, a gas outlet pipe an overflow pipe for removing supernatant waste water from said aerobic microbial oxidizing tank, solid separation means for removing flocculated phosphorous-containing solids from the bottom of the aerobic microbial oxidizing tank through a pipe, and pipe means for delivering a supernatant from the anaerobic microbial decomposition tank to a bottom of the aerobic microbial oxidizing tank, and recycling pipe means for recycling supernatant waste water from a top part of the aerobic microbial oxidizing tank to an inlet of said anaerobic microbial decomposition tank.

2. A waste water disposal apparatus according to claim 1, wherein said anaerobic microbial decomposition tank contains denitrifing bacteria in said tank.

3. A waste water disposal apparatus according to claim 1, further comprising a polymeric flocculating agent supply pipe connected to said aerobic microbial oxidizing tank.

4. A waste water disposal apparatus according to claim 1, wherein said stirrer in said flocculation mixing tank is capable of vigorously stirring.

5. A waste water-disposal apparatus according to claim 4, wherein said stirrer is capable of vigorously stirring at 200 rpm.

6. A waste water-disposal apparatus according to claim 1, further comprising an aeration cylinder in said aerobic microbial oxidizing tank.

7. A waste water-disposal apparatus according to claim 6, wherein at least one of said overflow pipe and said pipe means for recycling supernatant waste water is connected to said aerobic tank in a region not directly above said aeration cylinder.

8. A waste water-disposal apparatus according to claim 1, further comprising a solid discharge pipe for removing solids from a bottom of said anaerobic microbial decomposition tank.

9. A waste water-disposal apparatus according to claim 8, further comprising a solids reservoir for storing solids from said solid discharge pipe.

10. A waste water-disposal apparatus according to claim 1, further comprising a solid discharge pipe for removing solids from a bottom of said aerobic microbial oxidizing tank.

11. A waste water-disposal apparatus according to claim 1, further comprising a gas outlet pipe for gases at a top of said anaerobic microbial decomposition tank, a top of said aerobic microbial oxidizing tank or both.

* * * * *